Dec. 29, 1936.　　　E. G. BUSSE　　　2,065,791
BRAKE GEAR GUARD
Filed Sept. 4, 1934　　　3 Sheets-Sheet 1

Inventor
Edwin G. Busse.
By Rodney Bedell
Attorney

Dec. 29, 1936.  E. G. BUSSE  2,065,791
BRAKE GEAR GUARD
Filed Sept. 4, 1934  3 Sheets-Sheet 2
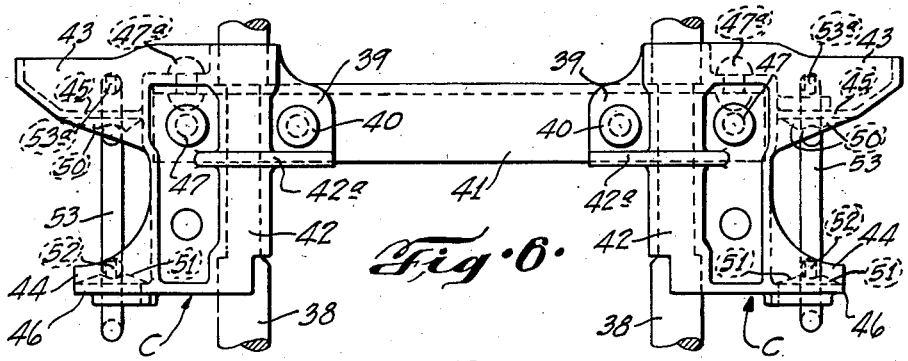
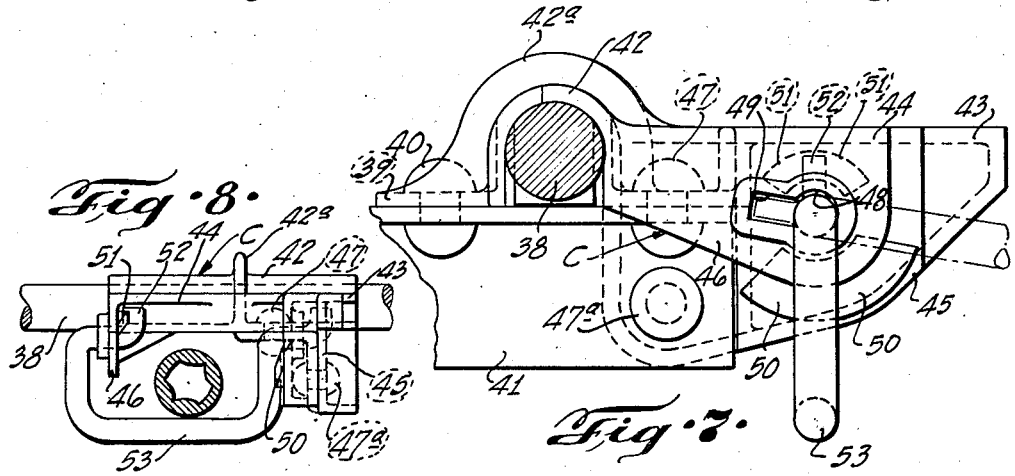
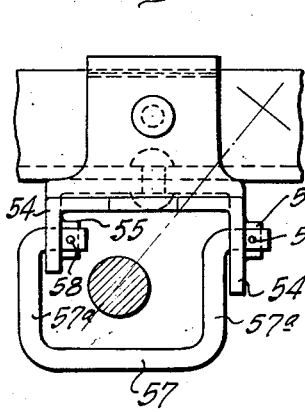
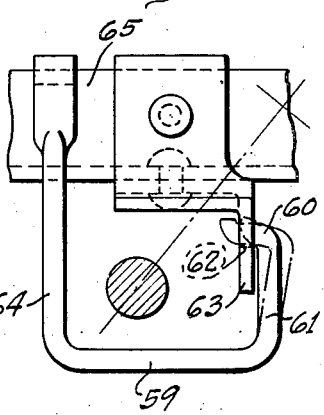
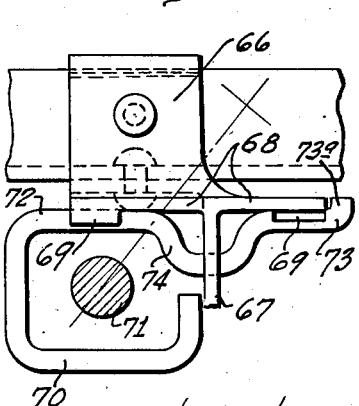
Inventor
Edwin G. Busse.
By Rodney Bedell
Attorney Dec. 29, 1936. E. G. BUSSE 2,065,791
BRAKE GEAR GUARD
Filed Sept. 4, 1934 3 Sheets-Sheet 3
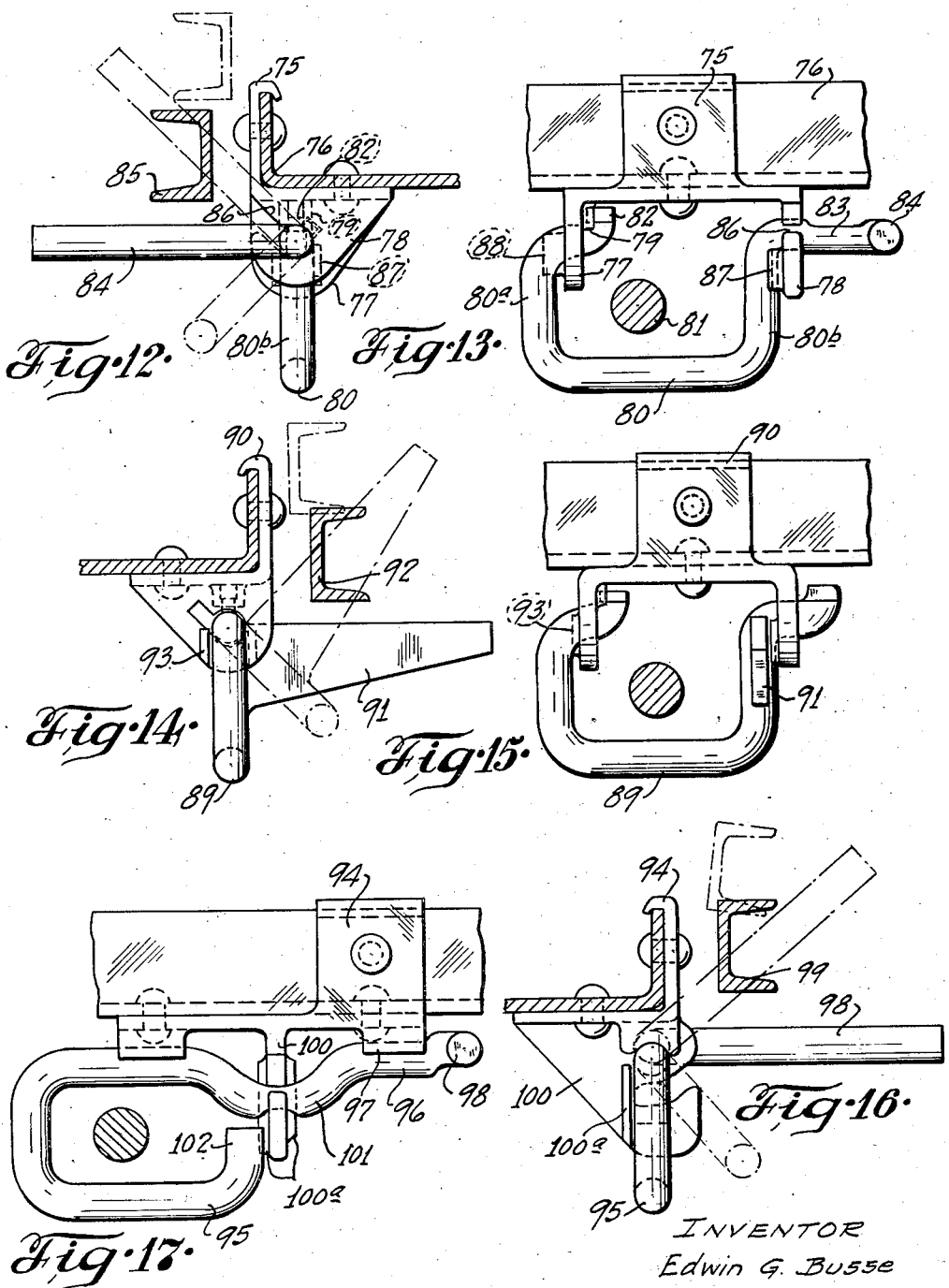
INVENTOR
Edwin G. Busse
By Rodney Bedell
ATTORNEY Patented Dec. 29, 1936

2,065,791

UNITED STATES PATENT OFFICE 2,065,791

BRAKE GEAR GUARD

Edwin G. Busse, Chicago, Ill., assignor to Chicago Railway Equipment Company, Chicago, Ill., a corporation of Illinois Application September 4, 1934, Serial No. 742,570

23 Claims. (Cl. 188—210)

This invention relates to safety guards for brake gear and particularly brake lever connecting rods for railway vehicles.

An object of the present invention is to provide a guard for brake rods and/or brake beams which may be readily applied to a convenient truck part and which resists removal therefrom except when manipulated in a predetermined manner.

A more detailed object is to provide means for pivotally supporting a brake gear guard from a truck part, the swinging of the guard being yieldingly resisted.

Another object is to provide a pivoted guard for brake rods having means for resisting the free swinging thereof, the initial resistance to swinging away from the operative position being greater than the resistance to swinging of the guard in any other position thereof.

Another object is to provide a novel combination brake rod and brake beam guard which is carried from a single bracket.

In a co-pending application Serial No. 582,454, filed December 21, 1931, in the name of the present inventor, now Patent No. 1,981,902 is illustrated and claimed a brake rod guard supported by and intimately associated with a brake beam guard, guide, or support device which in turn is carried by the truck spring plank or other suitable part.

In a preferred form of the present invention, a brake rod safety guard is carried by a bracket having a pair of depending flanges with apertures generally circular except for restricted enlargements or slots extending therefrom. The rod guard member is in the form of a rod of spring material bent so as to be inserted in the flange apertures in one position of the member and having offset portions which prevent removal of the guard when rotated to its normal operative position. The bracket mounting the rod guard also functions as a safety guard for an adjacent brake beam. Certain features of the present invention are also disclosed in the above-mentioned co-pending application.

In the accompanying drawings illustrating the invention—

Figure 6 is a partial top view of a portion of a modified truck with a form of the invention applied thereto.

Figure 7 is an end view of one of the guards and brackets in Figure 6.

Figure 8 is a side view of the structure in Figure 7 and showing the brake rod in section.

Figure 3:
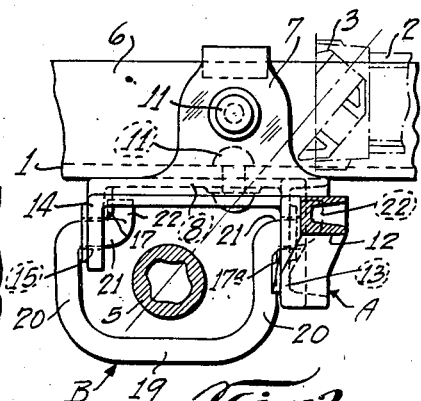
Figure 3 is an end view of the structure in Figure 2 and showing a portion of the bracket in section.
Figure 4:
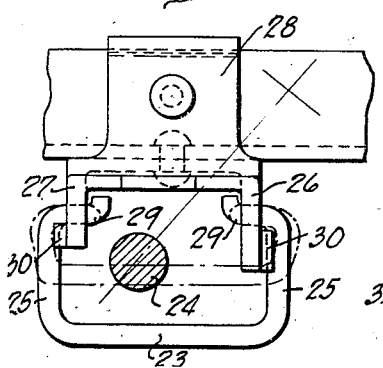
Figures 4 and 5 are end views corresponding to Figure 3 but showing modifications, the support bracket being illustrated entirely in elevation.
Figure 5:
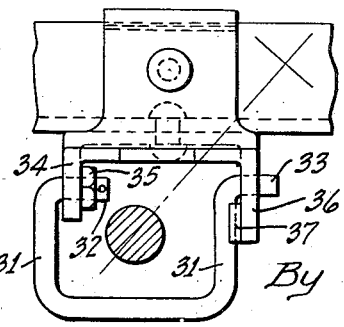

Figures 9, 10, and 11 are views corresponding to Figures 3, 4, and 5 but showing still other forms of the invention applied to the spring plank.

Figures 12, 14, and 16 are sections through spring planks and showing side views of various forms of combination bottom rod and brake beam safety guards pivotally carried by brackets on the spring planks.

Figures 13, 15, and 17 are end views of the structures in Figures 12, 14, and 16, respectively.

Figure 1:
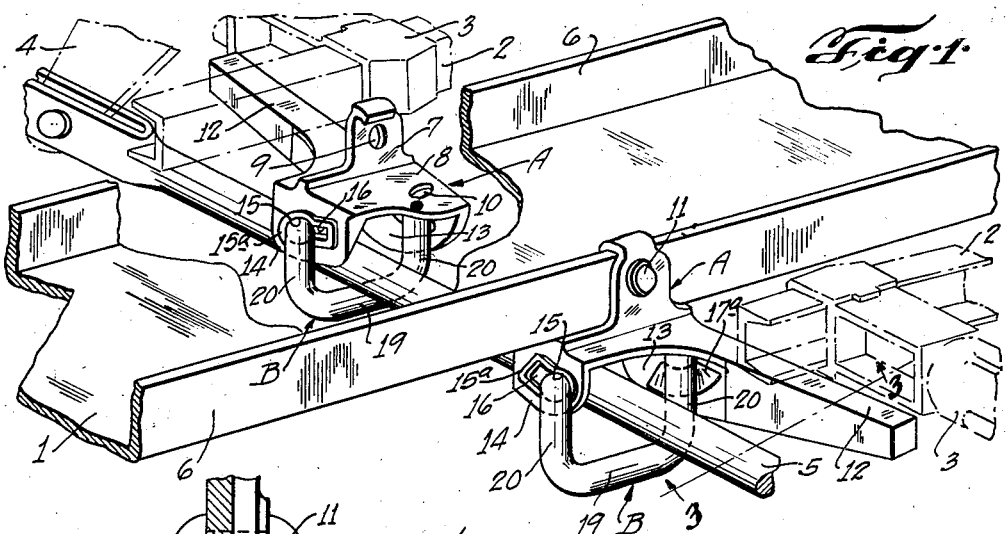
Figure 1 is a perspective view of a railway truck spring plank having one form of the invention applied thereto.
Figure 2:
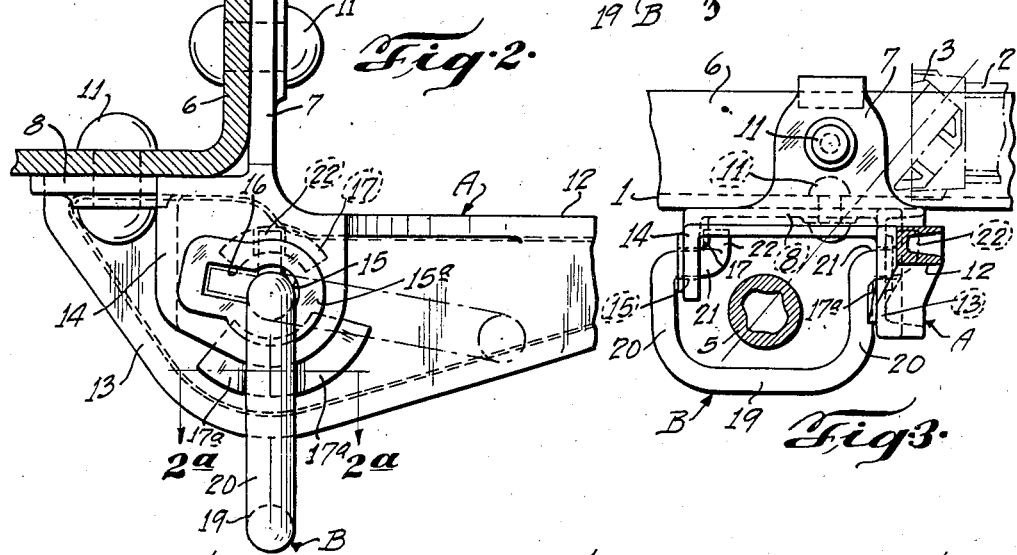
Figure 2 is a detail vertical transverse section through the spring plank and showing a side view of the rod guard and bracket.

In Figures 1, 2, and 3 is illustrated the spring plank 1 of a railway truck having the usual brake beams which in the present instance are of truss-type, each including a compression member 2 and strut 3, the beams being operated by any suitable mechanism including the brake lever 4 and the brake bottom connection 5 extending beneath the spring plank.

Secured to the upright flanges 6 of the spring plank are a pair of brackets, generally indicated at A, each having angularly disposed elements 7 and 8 with perforations 9 and 10 for bolting or riveting to one of the upright flanges and the bottom web, respectively, of the spring plank, as at 11. Each bracket has an arm 12 projecting laterally of the spring plank beneath the adjacent brake beam and functioning as a safety guard therefor to prevent the beam from dropping to the tracks in case of loss or breaking of a hanger pin or injury to the hanger.

Each bracket also includes a pair of depending flanges 13 and 14, the former merging at one end with the arm 12, which flanges are provided, respectively, with apertures such as that at 15 in Figure 2, of generally circular shape except for a restricted enlargement or slot 16 extending therefrom. On the inner surfaces of the flanges 13 and 14 are the shoulders 17 and 17a forming concave seats as at 18 in Figure 2a. Irregular bosses 15a surround the apertures 15, 16 on one side of each of the flanges 13 and 14.

The brake rod guard generally indicated at B is formed of a rod of spring material, such as spring steel, and includes a bottom horizontal portion 19 extending beneath the rod 5 and legs 20 with Z-shaped extremities including offset portions 21 and 22, the latter extending in the general direction of the legs 20. The portions 21 and 22 of the legs 20 are adapted to be inserted through the apertures 15 and enlargements 16 in the flanges 13 and 14 when the guard is in the approximately horizontal position shown in broken lines in Figure 2. The guard is then rotated to the vertical solid line position shown in Figure 2 in which the offset 22 on one end of the guard is seated in the recess between the shoulders 17 on the flange 14. The offset 22 at the opposite end of the guard engages the outer face of the flange 13 and the leg 20 adjacent the same seats in the recess 18 between shoulders 17a on the inner surface of flange 13. The offsets 22 prevent withdrawal of the guard from the bracket apertures.

The guard B is preferably formed with its legs 20 normally disposed outwardly at an angle from the positions thereof in Figure 3 so that these legs must be distorted inwardly to insert the guard in the bracket apertures and when the guard is in the operative position the offset 22 at one side and the leg 20 at the other side resiliently engage the inner surfaces of the flanges 13 and 14 and the seats between shoulders 17 and 17a.

The shoulders 17 and 17a serve to substantially increase the initial resistance to swinging of the guard in case of striking an obstruction between the rails. In case the bottom portion 19 of the guard is forced against the rod, the rod will force the guard down sufficiently to permit normal operation of the brakes. The enlargements 16 are preferably disposed so that the rod guard offsets 22 cannot be withdrawn therethrough when the bottom rod is in position. The bottom connecting rod is applied after the rod guards B are secured to their supporting brackets.

In Figure 4, the rod guard includes a portion 23 extending beneath the rod 24 and spring legs 25 which extend along the outsides of the flanges 26 and 27 on the spring plank bracket 28. When the guard is positioned as indicated in broken lines, the legs 25 may be distorted inwardly to force the S-shaped offsets 29 through slotted apertures in flanges 26 and 27 corresponding to the apertures 15, 16 in Figures 1 and 2. In the operative position of the guard, shown in full lines, the legs 25 are seated against the shoulders 30 formed on the outer surfaces of flanges 26 and 27.

In Figure 5 the legs 31 of the rod guard device have angularly disposed portions 32 and 33 at their ends extending through flanges 34 and 36 of the support bracket. The end 32 is threaded and secured to the bracket flange 34 by a nut 35. The spring tension within the guard in the operative position shown in the figure normally urges the leg 31 on the opposite side against the inner surface of flange 36 and the recess between the shoulders 37.

In Figures 6, 7, and 8, the brackets C are shown applied to the rods 38 which extend transversely between the truck side frames (not shown), this manner of mounting being convenient in a spring plank-less truck. The brackets C have inwardly extending lugs 39 riveted at 40 to a brace 41 which extends between the brackets carried on the spaced rods.

Figure 2A:
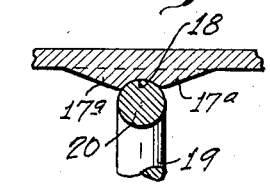
Figure 2a is a detail horizontal section taken on line 2a—2a of Figure 2.

Each bracket C has an upwardly bowed portion 42 reinforced by rib 42a and receiving the rod 38, and lateral arms 43 and 44 having depending flanges 45 and 46. The arm 43 is riveted to the horizontal and vertical flanges of angular stabilizing bar 41 as at 47 and 47a and serves as a brake beam safety guard similarly to the projecting member 12 in Figures 1, 2, and 3. Each of the flanges 45 and 46 has a generally circular aperture as at 48 with a restricted slot 49 corresponding to the slotted apertures 15, 16 in Figures 1, 2, and 3. On the inner surfaces of the flanges 45 and 46 are the shoulders 50 and 51 having arcuate recesses therebetween, as illustrated in Figure 2a, for receiving the offset finger 52 on one end of the bottom rod guard 53 and the opposite leg 53a thereof. The guard is formed of spring material and its ends are distorted inwardly to permit insertion in the flange apertures as in the first form described.

In Figure 9 the spring plank bracket flanges 54 and 54a are provided with bosses 55 and 56. The legs 57a of the rod guard 57 extend along the flanges 54 and 54a and then are bent at right angles and extend through the apertured bosses 55 and 56. The short end portions of the guard legs are secured within the bosses by means of pins or cotter keys 58. In this form the rod guard is rigidly secured to its supporting bracket.

In Figure 10, the bottom rod guard 59 has an S-shaped portion 60 on the end of its leg 61 adapted to be inserted in the aperture 62 in the flange 63 of the spring plank bracket. The other leg 64 of the rod guard is hooked over the top of the flange 65 of the spring plank. The leg 61 of the guard initially is disposed as indicated by the dotted line position and is distorted in application to the spring plank bracket, the spring tension in the guard urging the portion 61 outwardly against the upper edge of aperture 62. The leg 61 cannot be withdrawn from the aperture 62 as long as the leg 64 is secured to the spring plank. The aperture 62 is shaped to receive the end 60 of the guard which is tilted to permit the leg 64 thereof to clear the spring plank. The aperture 62 need not have an enlargement as at 16 in Figure 1 for this purpose.

In Figure 11, the spring plank bracket 66 has a single depending flange 67 and a pair of horizontal members 68 projecting in opposite directions therefrom and having the pairs of shoulders 69 on the under surfaces thereof. The bottom rod guard device has a loop 70 at one end extending beneath the brake rod 71 and horizontal portions 72 and 73 seated between the pairs of shoulders 69 as indicated in Figure 2a, the portion 73 terminating in an offset finger 73a extending over the end of the adjacent bracket member 68. Between the portions 72 and 73 is a U-shaped part 74 extending through an aperture in the flange 67. In this form the spring tension in the part 74 of the guard maintains the portions 72 and 73 thereof yieldingly seated between the shoulders 69 so as to apply substantial initial resistance to swinging of the loop 70 as under impact of an obstruction between the rails. The aperture in flange 67 is of the proper size and shape to receive the curved guard member which is tilted during insertion and then sprung into position engaging the shoulders 69. This aperture need not be enlarged as at 16 in Figure 1.

In Figures 12 and 13, the bracket 75 on the spring plank 76 has flanges 77 and 78, the former having a slotted or elongated aperture corresponding to apertures 15, 16 in Figure 1, for instance, and shoulders 79 on its inner surface with a concave seat therebetween, as in Figure 2a. The spring member 80 extending beneath brake rod 81 has an offset 82 at the end of one leg 80a adapted to be inserted through the aperture in flange 77 in one position of the guard. The other leg 80b of the guard member has angularly disposed arms 83 and 84, the latter extending laterally of the spring plank beneath the adjacent brake beam 85 and functioning as a safety guard therefor in the normal operative position of the member. Arm 83 is of reduced thickness so as to be inserted through a slot 86 extending from the edge of flange 78 to the aperture therein for receiving the guard.

Slot 86 and the elongated aperture in flange 77 are disposed to receive the reduced arm 83 and offset 82, respectively, of the combination brake rod and brake beam safety guard member 80 in the broken line position in Figure 12, and when the guard legs are distorted inwardly. In the normal operative position of the guard, the offset 82 and the leg 80b yieldingly engage shoulders 79 and 87 on the flanges 77 and 78, respectively, and leg 80a abuts a lug 88 to prevent the guard from swinging counterclockwise beyond the solid line position in Figure 12, and this provides rigid support for the brake beam in case the same is dropped for any reason. The beam must be raised to the broken line position in Figure 12 to permit application of the guard to its support bracket.

In Figures 14 and 15, the rod guard 89 and the manner of supporting and stabilizing the guard from the bracket 90 are the same as in Figures 1 to 3. The brake beam safety guard portion of the bracket is omitted and an arm 91 welded to one arm of the guard 89 extends beneath the brake beam 92. The combination rod and brake beam guard is prevented from swinging clockwise beyond the operative position by a lug 93 on one flange of the bracket 90.

In Figures 16 and 17, the bracket 94 and the rod guard 95 are substantially similar to the corresponding parts in Figure 11 except that one of the arms 96 of the guard, yieldingly engaging the shoulders 97, has an angular offset 98 disposed to extend laterally of the spring plank beneath the adjacent brake beam 99 in the operative position of the device. Lugs 100a are provided on the bracket rib or flange 100 for co-operating with the V-shaped part 101 and the end 102 of the guard to limit swinging thereof.

In Figures 12, 13, 16, and 17, the combination brake rod and brake beam guard may be conveniently formed of a continuous rod of spring material. In none of these figures, nor in Figures 14 and 15, does the beam guard structure affect the operation of the rod guard except to prevent swinging of the rod guard in one direction from the operative position.

In each of the forms in Figures 1 to 11, the bracket supporting the bottom rod guard may be shaped so as to function as a brake beam guard, guide, or support, as most clearly shown in Figure 1, or this function of the bracket may be omitted. Any of the rod guards shown in Figures 1 to 11 may be modified as in Figures 12 to 17 to include a brake beam guard, in which case the brake beam guard arm on the supporting bracket, where one is provided, would be omitted. The bottom rod guard bracket may be attached to any convenient truck part or, if desired, the bracket may be omitted and the supporting truck part properly shaped to mount the guard. In most of the forms, the spring tension in the rod guard cooperates with the supporting bracket to resist swinging of the rod guard from its operative position and also prevents destructive and noisy vibration between the parts. It would be within the spirit of the invention to utilize the supported guard for protecting other parts of the brake gear, the invention involving, broadly, novel means for attaching and supporting a brake gear guard on a truck.

The invention is not limited to the exact details of the forms illustrated but may be modified in various respects as will occur to those skilled in the art and the exclusive use of all such modifications as come within the scope of the appended claims is contemplated.

I claim:—

1. In combination in a railway truck, a member having a supporting portion and having a shoulder, and a brake bottom rod guard movably carried by said supporting portion and having an element yieldingly engaging said shoulder to resist relative movement of said guard.

2. Structure as specified in claim 1 in which said guard is pivotally carried by said supporting portion, said shoulder being disposed to engage said guard element when said guard is in its normal operative position.

3. Structure as specified in claim 1 in which a pair of said shoulders are provided with a recess therebetween for receiving said guard element to resist movement of said guard in either direction.

4. Structure as specified in claim 1 in which said guard is formed of a bent rod of spring metal.

5. Structure as specified in claim 1 in which said supporting portion forms a guard, guide, or support member for a brake beam.

6. In a railway truck, a support having a pair of recesses and a pair of apertures, a brake gear guard including a pair of spring elements adapted to be distorted to be inserted into said apertures, and structure for resisting withdrawal of said elements from said apertures, said elements being disposed to yieldingly engage said recesses to resist pivoting of said guard about said apertures.

7. In a railway truck, a support having a pair of spaced shoulders, and a brake gear guard having structure pivoted to said support, elements for engaging said shoulders when said guard is in its normal operative position, and spring structure urging said elements against said shoulders so as to yieldingly resist pivoting of said guard.

8. In a railway truck, vertically disposed supports having lateral apertures, said apertures being generally circular except for restricted enlargements, and a brake gear guard including parts extending through said apertures and being carried by sides thereof and elements at the ends of said parts and insertable through said enlargements in one position of said guard and disposed to extend along the support adjacent said apertures in another position of said guard so as to resist withdrawal of said parts from said apertures.

9. Structure as specified in claim 8 in which said guard includes spring structure between said parts for resisting swinging of said guard.

10. In a railway truck, a support, flanges projecting therefrom and having shoulders, and a brake gear guard pivoted to said flanges and yieldingly engaging said shoulders to resist pivoting of said guard.

11. In a railway truck, a support having an aperture, and a brake gear guard including an element engaging said support at a point spaced from said aperture, a part extending through said aperture and having an offset, and a spring part resisting relative movement of said guard and said support, said aperture being generally circular except for a restricted enlargement and said offset being adapted to be inserted through said enlargement in one position of said guard and disposed to engage said support in another position of said guard to resist withdrawal of the same from said aperture.

12. In a railway truck, a transversely extending member, a bracket thereon having a flange with an aperture, and a brake gear guard having an element engaging said bracket, an element extending through said aperture and having an offset, and spring structure between said elements for maintaining the same in yielding engagement with the associated parts of said bracket, said aperture having an enlargement for receiving said offset in one position of said guard and said offset being disposed to engage said bracket in another position of said guard to resist withdrawal of the element extending through said aperture.

13. Structure as specified in claim 12 in which said transverse member is a spring plank, there being one of said brackets and guards carried at each side thereof.

14. Structure as specified in claim 12 in which a pair of said transverse members are provided extending between the side members of the truck, there being one of said brackets and guards on each of said transverse members, and a brace between said brackets for stabilizing the same.

15. In a railway truck, a support having a pair of flanges with apertures and shoulders, and a brake gear guard including parts extending through said apertures, elements yieldingly engaging said shoulders to resist pivoting of said guard, and means resisting withdrawal of said parts from said apertures.

16. Structure as specified in claim 15 in which said parts have offsets at their ends, said apertures having enlargements for receiving said offsets in one position of said guard, said offsets being disposed to engage said flange in another position of said guard to resist withdrawal of said parts from said apertures, said elements engaging said shoulders in said second-mentioned position of said guard.

17. In a railway truck, a support including spaced flanges having apertures with bosses extending therearound, a brake gear guard having legs extending along said flanges and with parts passing through said apertures, and elements securing said parts in said apertures.

18. In a railway truck, a support having a flange and a shoulder projecting from said flange, and a brake gear guard pivotally mounted on said flange and having an element yieldingly engaging said shoulder to resist pivotal movement of said guard.

19. In a railway truck, a support having structure depending therefrom with spaced elements each having a shoulder, said structure constituting part of a brake beam guard, guide, or support, and a device disposed to underlay and safeguard a brake rod and with spaced end portions respectively pivotally supported by said structure, said portions having parts engaging said shoulders in the normal operative position of said device to resist initial pivoting of said device from said operative position.

20. Structure as specified in claim 19 in which the end portions of said device extend through apertures in said support structure, there being offsets on said end portions for resisting withdrawal thereof from said apertures.

21. In combination, a railway truck part and a brake beam safety device swinging on said part, in which said truck part includes an aperture and a shoulder, and said guard device is insertable in said aperture in one position of said device and includes an element preventing withdrawal of said device from said aperture in the operative position of said device, and an element for engaging said shoulder in said operative position to limit the swinging of said device in one direction.

22. In a railway truck, a brake bottom rod guard, and a bracket therefor having a portion directly supporting said guard and having a shoulder spaced from said portion, said guard having a part resting on said support portion and a part engaging said shoulder to normally hold said guard and bracket in functioning assembly.

23. In a railway truck, a frame member, a bracket carried thereby and having depending flanges each provided with a lateral shoulder and constituting part of a brake beam guard, guide, or support, and a device disposed to underlie and safeguard a brake rod with spaced end portions respectively pivotally supported by said flanges, said device including spring structure whereby said portions are thrust against said shoulders in the normal operative position of said device to yieldingly resist initial pivoting of said device from its operative position.

EDWIN G. BUSSE.